United States Patent
Maigné

(10) Patent No.: US 7,310,461 B2
(45) Date of Patent: Dec. 18, 2007

(54) OPTICAL ROUTING APPARATUS AND METHOD

(75) Inventor: Pascal Maigné, Samois sur Seine (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/019,717

(22) Filed: Dec. 21, 2004

(65) Prior Publication Data

US 2006/0062516 A1    Mar. 23, 2006

(51) Int. Cl.
*G02B 6/28* (2006.01)
(52) U.S. Cl. .............................. 385/24; 385/16; 385/20
(58) Field of Classification Search ...................... None
See application file for complete search history.

(56) References Cited

U.S. PATENT DOCUMENTS 6,771,905 B1*   8/2004   Bortz ........................... 398/45
2001/0030787 A1* 10/2001  Tajima ......................... 359/128
2004/0071160 A1*  4/2004  Park et al. ................... 370/465
2005/0163430 A1*  7/2005  Noirie et al. ................ 385/56

* cited by examiner

*Primary Examiner*—Sung Pak
(74) *Attorney, Agent, or Firm*—Svetlana Z. Short

(57) ABSTRACT

An apparatus and method for routing optical signals in which at least one demultiplexer receives and demultiplexes an incoming wavelength-division-multiplexed optical signal into n individual channels. At least two multiplexers are used for assembling respective multiplexed output signals and are connected by an array of semiconductor optical amplifiers (SOAs), each channel having correspondingly at least two SOAs connecting it respectively to each of the multiplexers. The SOAs are operated in a co-ordinated switching mode to route the corresponding channel selectively to at least one of the multiplexers, and may also contribute gain. A proportionate signal may be split off from each channel and taken to a photodetector to enable the gain of the associated SOAs to be adjusted to equalize or otherwise balance the signal levels.

12 Claims, 2 Drawing Sheets

OPTICAL ROUTING APPARATUS AND METHOD

BACKGROUND OF THE INVENTION

1. Field of the Invention

The present invention relates generally to optical communications, and particularly to apparatus for and a method of routing individual channels, or sub-bands of channels, of at least one incoming wavelength-division-multiplexed (WDM) signal, each to one or more of outgoing signals selected from two or more, the outgoing signals being multiplexed signals or single-channel signals as required.

2. Technical Background

Efficient management of high-capacity WDM optical communications networks requires routing apparatus (known as add-drop units or filters) that are "tunable" to select any one, or more than one, of the channels making up the signal, and extract it, or them, individually or in subgroups, for direction to a desired destination. An important application of such apparatus is at the node where a local loop is connected to a metropolitan loop, where it serves to select the particular channels (or subgroups) to serve the local loop. If possible, such apparatus should be capable of very rapid route-switching; it must maintain signal levels and if possible equalize or otherwise balance them between the various channels.

SUMMARY OF THE INVENTION

One aspect of the invention is an apparatus for routing optical signals which comprises:
  at least one demultiplexer for receiving and demultiplexing an incoming wavelength-division-multiplexed optical signal into n individual channels;
  at least two multiplexers for assembling respective multiplexed output signals; and
  for each said channel, semiconductor optical amplifiers (SOAs) respectively connected to each of said multiplexers;

said semiconductor optical amplifiers being operable in a co-ordinated switching mode to route each said channel selectively to at least one said multiplexer.

In another aspect, the present invention includes a method of routing optical signals which comprises:
  demultiplexing an incoming wavelength-division-multiplexed optical signal into n individual channels;
  connecting each said channel by semiconductor optical amplifiers to at least two multiplexers capable of forming respective multiplexed output signals; and
  operating said semiconductor optical amplifiers in a co-ordinated switching mode to determine the route taken by each said channel.

It will be apparent that multiplexed output signals will only be produced by the multiplexer or multiplexers to which more than one channel is currently routed, and that the SOAs may be operated to route a given channel to more than one multiplexer if and when desired.

By a "co-ordinated" switching mode is meant simply a mode in which individual semiconductor optical amplifiers are operated at the times required to achieve the desired routing. In most cases, that will mean that one semiconductor optical amplifier is turned on to open a new route and a second semiconductor optical amplifier is turned off at about the same time to close the previous route. The simplest mode for this operation will switch both these semiconductor optical amplifiers simultaneously, but since switching is not quite instantaneous, this may lose a small amount of data in the switching interval. If this is thought to matter in the context of the particular application, it may be preferred to delay the turning off of the second semiconductor optical amplifier until the new route is fully open. Somewhat different combinations of switching operations may be required where an incoming channel is being, or is to be, broadcast to two or more outputs, and in the limiting case where a single channel is to be sent to one more or one less output, only a single semiconductor optical amplifier will need to be switched, on or off respectively.

If desired, an additional demultiplexer and an appropriate number of SOAs could be used to connect channels from a second incoming signal, or input, selectively to the same multiplexers, with the proviso that if the incoming signals include channels of the same (or nearly the same) wavelength, additional control complexity will be needed to ensure that they are not routed to the same multiplexer. In principle, this could be extended to three or more inputs.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
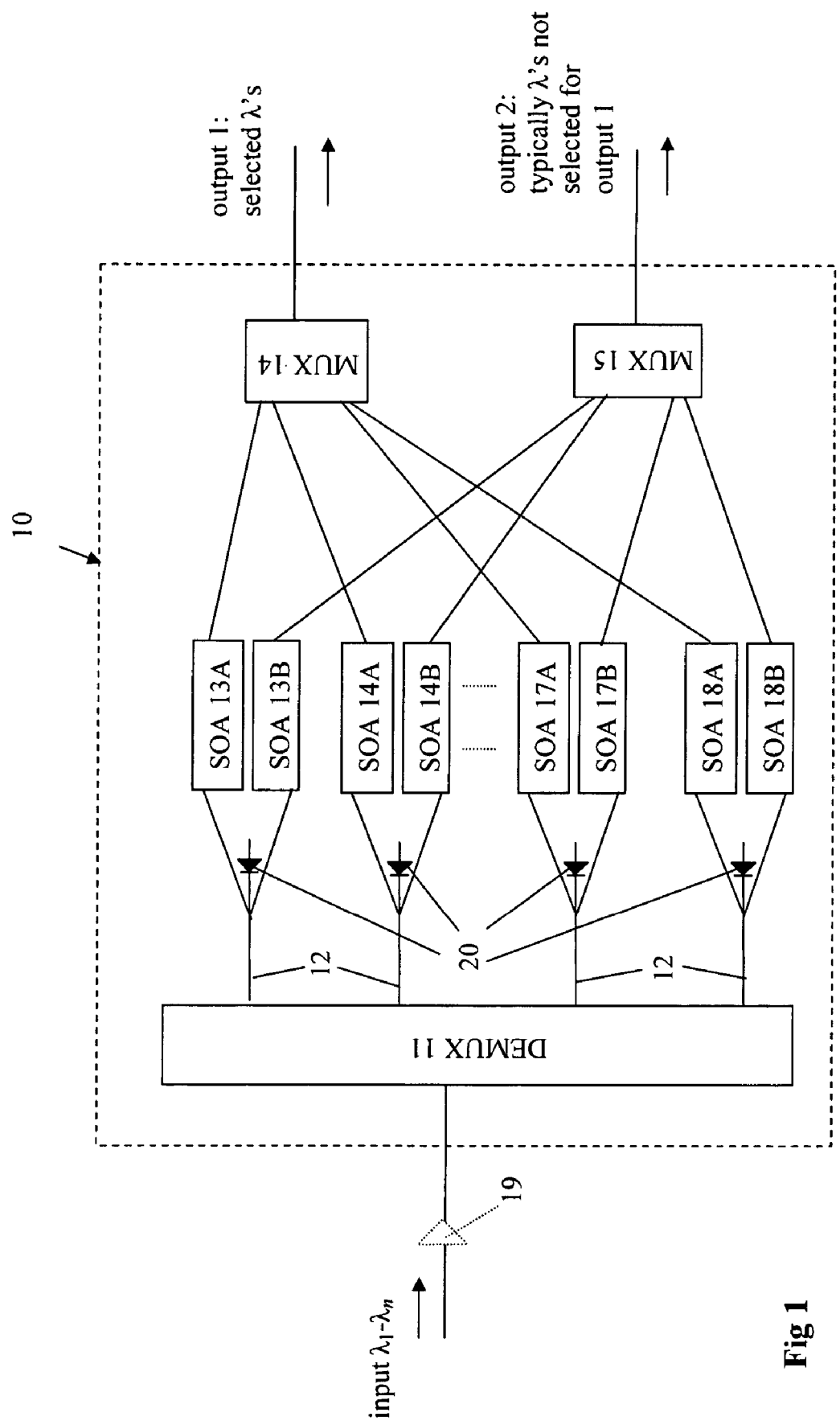
FIG. 1 is a diagrammatic representation of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts.

One embodiment of the apparatus of the present invention is shown in FIG. 1, and is designated generally by the reference numeral 10.

It comprises a demultiplexer 11, which may be of any conventional type, which receives a WDM input comprising n channels characterized by respective center wavelengths $\lambda_1$ through $\lambda_n$ and separates them onto respective optical waveguides 12 (for simplicity, only the parts of the apparatus relating to channels 1, 2, n-1 and n are shown), each of which is split and connected to two SOAs. SOA 13A receives the signal on channel 1 and is connected to a first multiplexer 14; SOA 13B also receives the signal on channel 1 but it is connected to a second multiplexer 15. The SOAs are to be operated in a co-ordinated switching mode by conventional control circuitry (not shown), and it is thus possible to connect the signal on channel 1 to multiplexer 14 by setting SOA 13A on, to multiplexer 15 by setting SOA 13B on, or to both of them by setting SOAs 13A and 13B on simultaneously. Similarly, SOAs 16A and 16B can be operated to connect channel 2 to either or both of the multiplexers, and so on for the remaining channels, to SOAs 17A and 17B for channel n-1 and SOAs 18A and 18B for channel n.

Each of the multiplexers 14 and 15 operates conventionally to feed to respective outputs the channel or channels that they receive, and it is thus possible to send each channel independently to either or both of the outputs. So the apparatus can be used without any structural modification to drop out a single channel, to drop out a subset of channels or a number of individual channels for routing together, or if desired to broadcast one or more than one signal to both outputs. With appropriate control circuitry, route-switching can be achieved in a few nanoseconds if required.

Preferably the SOAs, when turned on, operate with a gain >1 so as to compensate, at least in part, for the insertion losses of the apparatus (which will always be over 3 dB, because of the splitting). If desired, they may fully compensate for losses, but considerations of signal-to-noise ratio may make it preferable (if the available signal level requires it) to include a separate low-noise amplifier 19 at the input to the apparatus. Erbium-doped fiber amplifiers and SOAs are considered suitable for this purpose.

Optionally, each channel is further split to provide a proportionate signal to a respective photodetector diode 20 in order to generate a control signal for use in independently adjusting the bias, and thus the gain, of the respective SOAs to equalize (or otherwise balance) the signal levels in the various channels.

The multiplexers 14 and 15 are preferably implemented as arrayed-waveguide gratings, as this allows some optical noise (in particular, spontaneous-spontaneous beat noise) to be filtered out and not reach any of the outputs.

The apparatus of the invention may be implemented as a hybrid integrated optical planar device, or with discrete components connected by fibers, as is well-known in the art.

Figure 2:
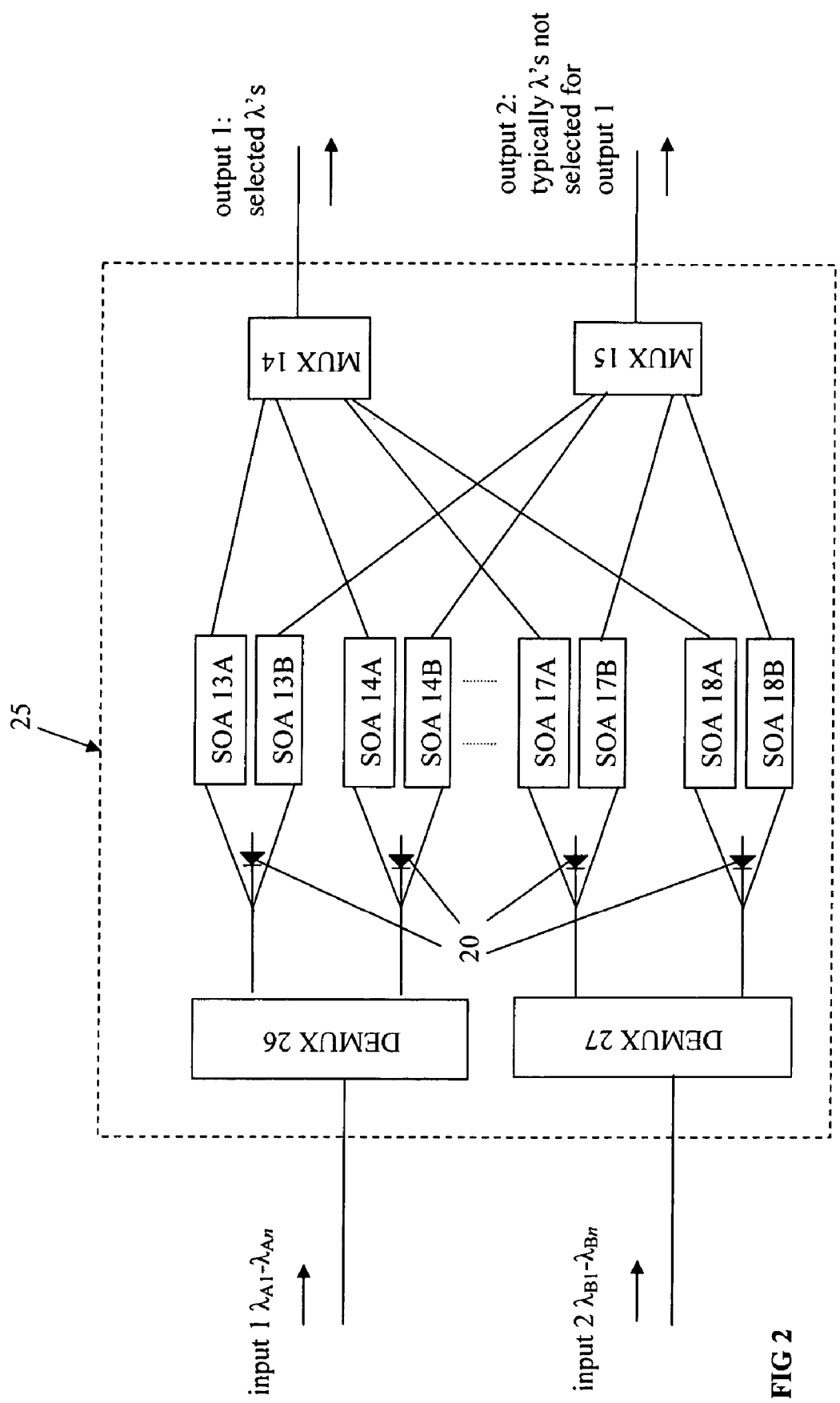
FIG. 2 is a diagrammatic representation of a second embodiment of the invention.

The invention is not limited to a single input; FIG. 2 shows a modified apparatus 25 in which two inputs are received by respective multiplexers 26 and 27, each with its own array of SOAs connected to the same pair of multiplexers 14 and 15. If the channels characterized by wavelengths $\lambda_{A1}$ through $\lambda_{An}$ contained in the first input all differ from the channels characterized by wavelengths $\lambda_{B1}$ through $\lambda_{Bn}$ contained in the second input, no complications arise; if any channels are utilized in both inputs, it will be necessary to operate the control circuit to avoid sending like channels from the two inputs to the same output, and preferable for the control circuit to have interlocks to prevent it.

The apparatus of FIG. 2 might be used, for example, to connect incoming signals from two medium-sized satellite towns or industrial areas to the metropolitan ring of a large city with traffic levels such that the incoming signals individually do not need all the potential channels all the time. The incoming signals can share channels under a management system that allocates channels on a shifting basis according to demand, say at different times of day; for example allocating some channels to an industrial area in daytime and a residential one in the evening. Alternatively, sharing could be managed by the equivalent of a "busy" signal, leaving the signal source to search for an available channel, or by "collision direction" in the sense the phrase is used in respect of practice in local-area networks of the Ethernet type.

Similarly, the invention is not limited to two outputs: three (or more, but losses may become excessive) can be served by providing the same number of multiplexers and as many SOAs for each separated channel.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An apparatus for routing optical signals which comprises:
    at least one demultiplexer for receiving and demultiplexing an incoming wavelength-division-multiplexed optical signal into n individual channels;
    at least two arrayed-waveguide grating multiplexers for assembling respective multiplexed output signals; and
    for each said channel, semiconductor optical amplifiers respectively connected to each of said multiplexers;
    said semiconductor optical amplifiers being operable in a co-ordinated switching mode to route each said channel selectively to at least one said multiplexer and having gain sufficient to substantially compensate for insertion losses of the apparatus.

2. An apparatus in accordance with claim 1 comprising an additional demultiplexer and a plurality of semiconductor optical amplifiers to connect channels from a second input selectively to the same multiplexers.

3. An apparatus in accordance with claim 1 further comprising a separate low-noise amplifier at the input to said apparatus and in which said low-noise amplifier and said semiconductor optical amplifiers operate with a combined gain sufficient to fully compensate for insertion losses of the apparatus.

4. An apparatus in accordance with claim 3 in which said separate low-noise amplifier is an erbium-doped fiber amplifier.

5. An apparatus in accordance with claim 3 in which said separate low-noise amplifier is a semiconductor optical amplifier.

6. An apparatus in accordance with claim 1 wherein each channel comprises a further splitter and a respective photodetector connected to receive a proportionate signal so as to generate a control signal for use in independently adjusting the bias, and thus the gain, of the respective semiconductor optical amplifiers to equalize signal levels.

7. A method of routing optical signals which comprises:
    demultiplexing an incoming wavelength-division-multiplexed optical signal into n individual channels;
    connecting each said channel by semiconductor optical amplifiers to at least two arrayed waveguide multiplexers potentially to form respective multiplexed output signals; and
    operating said semiconductor optical amplifiers in a co-ordinated switching mode to determine the route taken by each said channel, said semiconductor optical amplifiers having gain sufficient to substantially compensate for insertion losses introduced by the method.

8. A method in accordance with claim 7 comprising using an additional demultiplexer and a plurality of additional semiconductor optical amplifiers to connect channels from a second input selectively to the same multiplexers.

9. A method in accordance with claim 8 comprising applying controls to ensure that channels of the same wavelength are not routed to the same multiplexer.

10. A method in accordance with claim 7 further comprising using a separate low-noise amplifier to amplify the incoming optical signal, the semiconductor optical amplifiers and the low-noise amplifier having a combined gain sufficient to fully compensate for insertion losses introduced by the method.

11. A method in accordance with claim 7 comprising further splitting each said channel to provide a proportionate signal to a respective photodetector diode in order to generate a control signal and using said control signal to adjust the bias, and thus the gain, of the respective semiconductor optical amplifiers independently to balance signal levels in said channels.

12. A method in accordance with claim 11 in which said signal levels are equalized.

* * * * *